Nov. 18, 1969   R. BARDET-NEYRIN   3,478,901
PACKING OF PASTE PRODUCTS

Filed April 14, 1967   6 Sheets-Sheet 1

INVENTOR
René Bardet-Neyrin
BY
ATTORNEYS

Nov. 18, 1969    R. BARDET-NEYRIN    3,478,901
PACKING OF PASTE PRODUCTS

Filed April 14, 1967                            6 Sheets-Sheet 4

INVENTOR
René Bardet-Neyrin
BY Alexander Powell
ATTORNEYS

United States Patent Office 3,478,901
Patented Nov. 18, 1969

3,478,901
PACKING OF PASTE PRODUCTS
René Bardet-Neyrin, Avenue Jean-Jaures, Saint-Didier-au-Mont d'Or, Rhone, France
Filed Apr. 14, 1967, Ser. No. 631,063
Claims priority, application France, Apr. 19, 1966, 47,178
Int. Cl. B65g 1/00
U.S. Cl. 214—16
10 Claims

ABSTRACT OF THE DISCLOSURE

This system comprises a series of silos adapted to receive long paste products from the lower end of a filling mechanism. The system has two parallel corridors each having an outlet and an inlet and receiving empty silos and filled silos respectively. Means are provided in each corridor to urge the silos toward the outlet end of the silos. Two carriages are provided transversely reciprocable in relation to the corridor. Means are provided on each carriage to take the silos one by one from one end of one of the corridors and to move same to the end adjacent to the opposite corridor. Two handling stations are provided, one disposed above and the other below the path of movement of the carriages so as to enable loading of the empty silos and discharging of the filled silos respectively.

DESCRIPTION OF INVENTION

It is already known that paste products, after coming from the forming or pressing machine, are passed through a quite long drier before being weighed and packed. Experience shows that the manufacturing cycle alone (forming and drying) is longer than the packing cycle so that machines for performing the second cycle work at a slower speed than their normal operative speed, while needing the same number of operators.

The object of the present invention is to provide a storing system to dissociate the operation of these two aforementioned cycles. The said system is only able to store the pastes, and especially long pastes of the macaroni, spaghetti and the like types, to cut same to the desired length for packing, as they come from the drier, and to keep them until an opportune time arrives for weighing and packing.

The system according to this invention comprises in combination a series of silos intended to receive the paste products at the lower end of the drier, two parallel runs or corridors for the storing of empty bins or silos separate from full silos; two carriages transversally movable in reciprocable directions in relation to the said runs or corridors and provided with means to take the silos one by one from the end of one of the aforementioned corridors and to place them at the end adjacent to the opposite corridor; and two handling stations, one above and one below the rolling path of the above-mentioned carriages to allow respectively the loading of empty silos and the discharging of the full silos.

It is understood that the control of the different mechanisms according to the invention can be obtained by two suitably arranged programmers. The loading of the empty silos can thus be controlled in an automatic manner during the operation of the drier, the full silos accumulating in the corresponding corridor. When the thus constituted reserve is sufficient for the correct operation of the weighing and packing machines, the full silos stored in the aforementioned corridor are discharged, the emptied silos then progressively accumulating in the opposite corridor. Thus, the weighing and packing machines can operate under optimum yield conditions, no matter what the drying speed is.

The attached drawing shows an embodiment of the storing system according to the invention.

Figure 1:
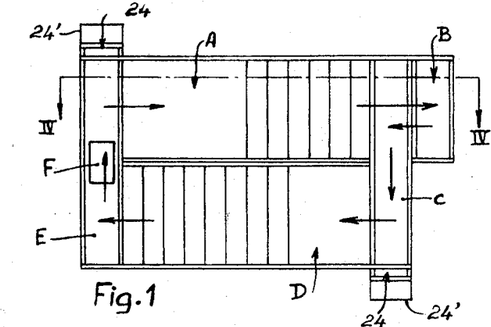
FIGURE 1 is a general schematic plan view of this system.

The storing system according to the invention, as is shown in FIGURE 1, comprises a series of silos intended to be moved from the downstream and (to the right of FIG. 1) of a first storing corridor A to the opposite end of upstream end of the latter. During its travel each silo moves first of all to a loading station B, thus first crossing the transverse bridge C provided for the moving of a first transporting carriage. After being filled with paste products, this silo returns below the bridge C and the corresponding carriage brings it to the upstream end of a second corridor D. This corridor D is disposed parallel to corridor A and is used to store full silos. At the down stream end of the corridor D, each silo comes under a bridge E, parallel to the above mentioned bridge C, and is transported by a second carriage to the upstream end of the latter, this end being considered as the starting point of the path. During its motion the second carriage stops each silo above a lower discharge station F, so that this silo returns in an empty state to corridor A where it is kept until used for a new cycle.

Figure 2:
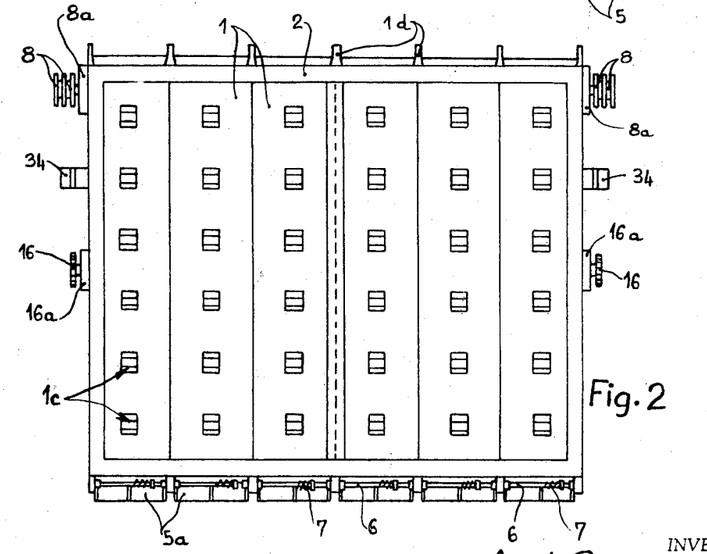
FIGURE 2 is an elevational view of one of the silos of the system.
Figure 3:
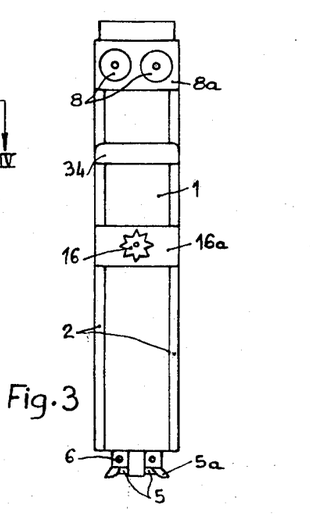
FIGURE 3 is a side view of one of the silos.

As shown in FIGS. 2 and 3, each silo comprises an assembly of a series of vertical cassions 1, mounted within a metallic frame 2, the thus constituted unit having an elongated rectangular horizontal profile, length substantially corresponding to the length of the long pastes (macaroni or spaghetti). This inner space of each caisson 1 is divided in two compartments 1a and 1b (FIG. 15) by means of a vertical medium partition 3 oriented longitudinally disposed with respect to the silo. The opposed sides of this partition 3 and the inner surface of the lateral walls of the caisson 1, which are disposed parallel to the said partition, are integral with guides 4 having a triangular cross-section, spaced regularly along the length of the caisson so as to determine a zigzag path for long paste products poured forth through the upper opening of each caisson. This zigzag path slows down the fall of the paste products and simultaneously insures that they remain in a horizontal position.

Figure 13:
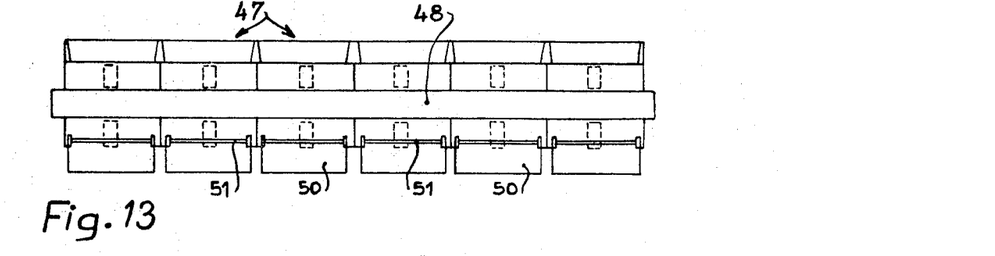
FIGURE 13 is an elevational view of the discharge spout battery associated with the mechanism of FIGURE 12.

The lower end of each compartment 1a and 1b is closed by a closing device comprising a shutter 5 pivoted on a longitudinal shaft 6 biased to a closed position by a torsion spring 7 (FIG. 2), each of the said shutters being integral with a controlling extension or ear 5a. It can be noted that the visible walls of the caissons 1 have windows 1c (FIG. 2) in them (not shown in FIG. 13) which allow the contents of each compartment 1a and 1b to be controlled.

Figure 4:
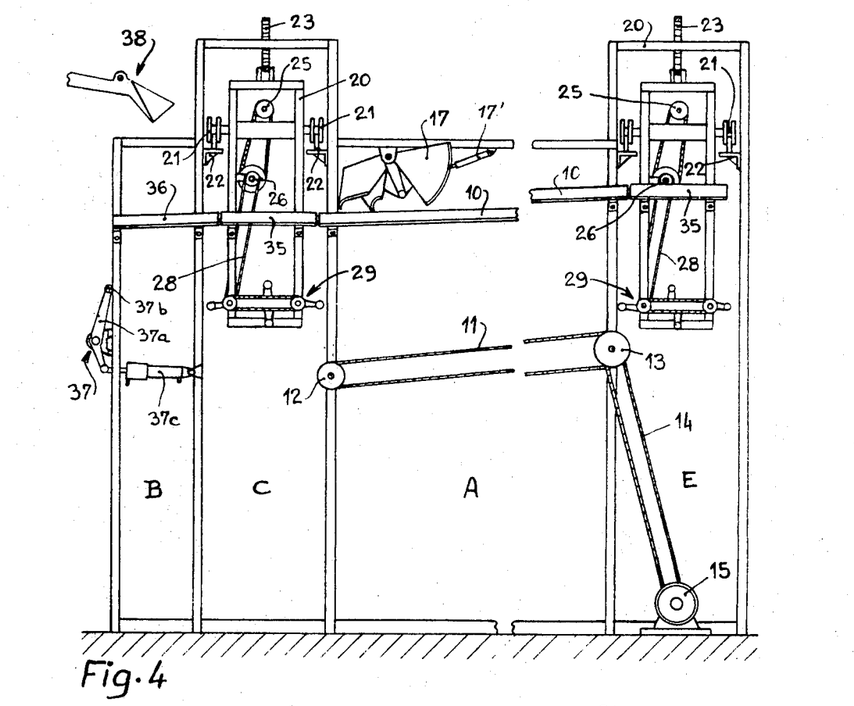
FIGURE 4 is a longitudinal section through the system along line IV—IV of FIGURE 1.
Figure 5:
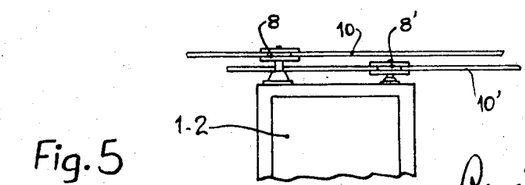
FIGURE 5 is a schematic plan view showing the mounting of the silos on the rails of one of the corridors.

Near its top each silo carries two pairs of rollers 8 mounted on longitudinal axles fixed on shoulders 8a, which are connected to the uprights of the corresponding frame 2. It should be noted that the two rollers on each shoulder 8a are displaced axially in relation to each other, as will be better understood from the following. These rollers 8 are intended to roll on rails 10 (FIG. 4) longitudinally directed in corridors A and D. These rails are fixed on the machine frame so as to have a proper slope to insure the movement of the silos by gravity alone. The slope of the rails 10 is inverse in both of the aforementioned corridors. For corridor A with empty silos, the rails' highest point is to the right of the transverse bridge E, while for corridor D, this highest point or upper extremity is to the right of bridge C. To keep the silos from moving in a position slanted in relation to the vertical because of the above-mentioned slope, each of these rails 10 is realized under double form. As is shown in FIG. 5, each rail 10 is associated with a counter rail 10' transversally offset in relation to the first and fixed slightly above it. Because of the axial displacement of the rollers 8 on each shoulder 8a, one of the rollers 8 thus rolls on rail 10 while the other referenced 8' in FIG. 5, moves on the counter rail 10'. The vertical offsetting of the rail 10 and counter rail 10' insures that the silos will remain in a vertical position, despite the slope of the said rail and counter rail.

To brake the silos during movement in corridors A or D, each corridor is associated with two chains 11 (FIG. 4) longitudinally disposed below the rails 10 of the considered corridor. These chains 11 run around two cog wheels 12 and 13, the latter being driven by a chain 14 driven by a driving motor 15 fixed to the lower portion of the system support. Each of these chains cooperates with a ratchet cog wheel 16 (FIGS. 2 and 3), of the so called free wheel type supported by a shoulder 16a integral with one or the other of the transverse walls of each silo. It is understood that when the chains 11 are driven at a slow speed, the cog wheels 16 engage with them so that the corresponding silo cannot move at a speed greater than the linear speed of the said chains despite the slope of the rails 10. An effective braking of the silos is thus obtained.

Figures 6, 7:
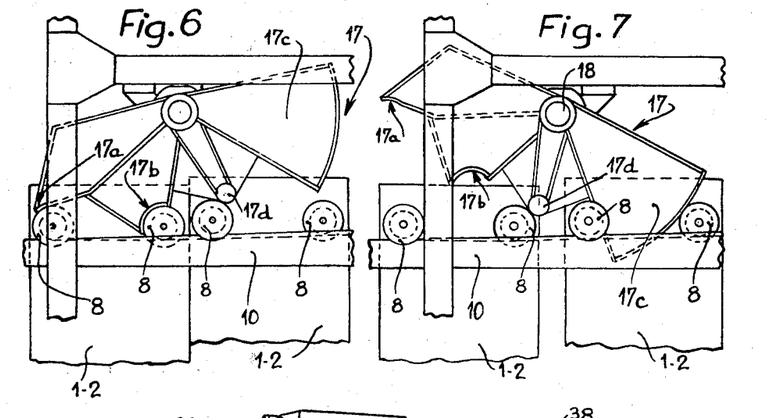
FIGURES 6 and 7 are detail views illustrating the arrangement and operation of one of the removable lug mechanisms associated with the corridors.

At the lower end of each corridor A or D it is necessary to provide separate mechanisms to stop the first silo of the row of silos stored in each corridor. Each of these mechanisms comprises a pivoting member 17 (FIGS. 6 and 7), mounted on a fixed transverse axle 18 and coupled to the piston of a pneumatic ram indicated as 17' in FIG. 4, which is itself connected to the system support. This pivoting member 17 is formed in such manner as to comprise two front lugs 17a and 17b, a sector-shaped back lug 17c, and an intermediary pushrod 17d. At the blocking position illustrated in FIG. 6, the front lugs 17a and 17b are positioned in front of the rollers 8 of the first silo of the row, and the row is thus retained at standstill. When the control ram 17' is activated the member 17 pivots around the axle 18 (FIG. 7) in such manner that the front lugs 17a and 17b liberate the rollers 8 of the first silo which is also positively urged by the action of the push rod 17d against the back roller of the silo under consideration. At the same time the back lug 17c comes between the two rollers 8 of the second silo which is thus blocked. It is understood that when member 17 returns to its initial position (in FIG. 6) the lug 17c becomes eclipsed and liberates this second silo which moves by gravity until its rollers 8 are stopped by the front lugs 17a and 17b.

Figure 8:
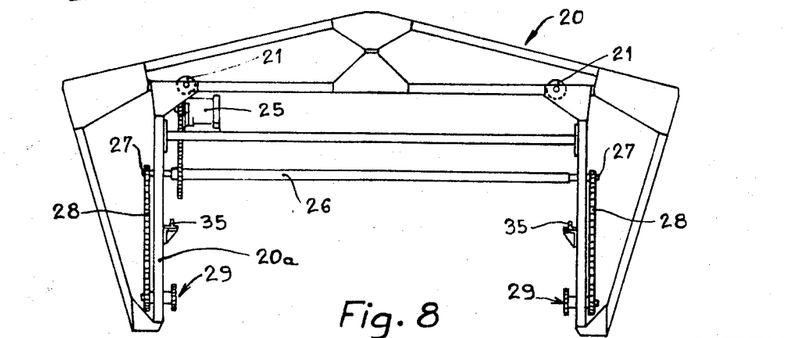
FIGURE 8 is an elevational view of one of the two transporting carriages.

A carriage 20 (FIG. 8) is mounted within each transverse bridge C and E. The frame of this carriage is provided with four rollers 21 which cooperate with longitudinal rails 22 supported by the bridge under consideration. These rails 22 have a slope with respect to the horizontal, the said slope being inverse from one bridge to the other. In the case of bridge C this slope is directed upwardly between the corresponding ends of the two corridors A and D, while for bridge E, it is directed downwardly between the said corridors. The alternate motion of each of the carriages 20 is insured by an endless chain 23 (FIG. 4) appropriately retained at the ends of the corresponding bridge and driven by a low speed motor and gearing set 24' (FIG. 1) fixed on a console 24 at the end of the said bridge.

Figures 9, 11:
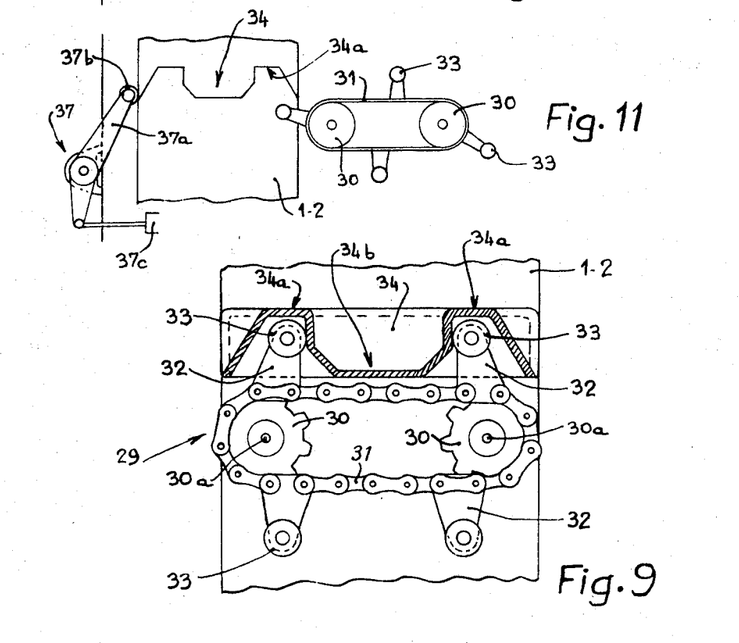
FIGURE 9 is an elevational view, partly in vertical section, of one of the grasping mechanisms mounted on the carriages.
FIGURES 10 and 11 schematically illustrate the operation of the mechanism in FIGURE 9 of the pushing mechanism associated with the loading station.

Fixed on each carriage is an electric motor 25 (FIG. 8) which drives a shaft 26 by a system of chains and cog wheels, longitudinally directed with respect to the said carriage. Fixed on each end of this shaft 26 is a gear 27 (FIG. 8) connected by a slanted chain 28 to a transfer mechanism 29 which is provided on the lower end of both of two vertical arms 20a of the carriage under consideration. As is shown in FIG. 9, each transfer mechanism 29 comprises two gears 30 mounted on axles 30a which extend longitudinally with respect to the direction of the carriage motion. These two gears 20, one of which is driven by the aforementioned chain 28, are connected to each other by a chain 31 on which four arms 32 are fixed at regular intervals. Each of the arms 32 carries a loose roller 33 at its end.

The above described transfer mechanisms are intended to cooperate with grasping members 34 provided on the transverse walls of silos 1-2. As shown, each of these members 34 comprises a U-shaped piece opening downwardly and within which is mounted a longitudinal sheet iron member which forms two depressions 34a (FIG. 9) opening downwardly and which are separated by a protruding portion 34b, the spacing apart of the two depressions 34a being substantially equal to that of two rollers 33 of the transfer mechanisms 29.

Each carriage 20 also comprises two rails 35 (FIG. 8) fixed on the vertical arms 20a separated from each other by a distance equal to that between the rails 10 of the corridors A and D, the said rails 35 being horizontally oriented. Under these conditions it is understood that when the eclipsing shoulder mechanism 17, mounted at the end of one of the corridors A or D, is activated, the silo 1–2 thus freed is pushed by the push rod 17d to such a position that, with the motor-reducing unit 25 operating, one of the fingers constituted by the cross bars 32 carrying the rollers 33 engages into the front depression 34a of each grasping member 34. The silo is thus pulled out of the storing corridor in which it was stored to engage into inside of the carriage 20 under consideration. Its rollers 8 thus roll on the rails 35 of the said carriage.

The reducing motor unit 25 is so adjusted that the chain 31 of the two transfer mechanisms 29 moves linearly a distance equal to half its total length, in such a manner that the silo is thus brought to the axis of the bridge C or E under consideration. At this position two consecutive fingers 32–33 are engaged in the depressions 34a of each lateral member 34, as is shown in FIG. 9. The silo is thus securely held and cannot move inopportunely along the path of the carriage 20. The latter stops at the end opposite the considered bridge and the transfer mechanisms 29 start to push the silo in the opposite direction to the upper end of the other corridor and to engage it on the corresponding rails 10. The silo then slides on these rails and is thus introduced into the corridor.

Figure 10:
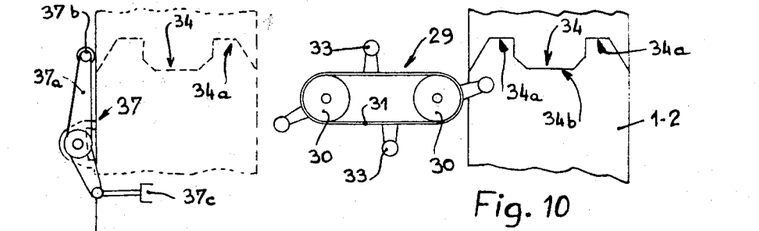

When however the carriage 20 associated with bridge C is opposite the lower end of the corridor corresponding to the empty silos, the motor-reducing unit 25 is controlled so that the path of the chains 31 of the two transfer mechanisms 29 corresponds, not only to its half length, but also to its total length. As is shown in FIG. 10, the silo 1–2 taken by the transfer mechanisms then crosses the carriage 20 under consideration and engages the rails 36 (FIG. 4) of the loading station B. These rails 36 have a slope in the same direction as the rails 10 of the corridor A, so that the silo comes to a stop against a push mechanism 37.

As shown in FIGS. 10–11, this push mechanism 37 comprises two vertical arms 37a pivoted on the supports of the system frame and connected to each other by a horizontal bar 37b. Beyond its pivot one of the arms 37a has an extension whose end is coupled to the piston of a pneumatic ram 37c which is itself mounted on the frame of the system by its cylinder as shown in FIG. 4. It is understood that after filling the silo under consideration, the ram 37c can be activated (FIG. 11) so as to push it in the direction of bridge C, the horizontal bar 37b resting against the lateral wall of the silo. The fingers 32–33 of the transfer mechanisms 29, when in operation, can thus cooperate with the grasping members 34 to bring the silo onto the axis of the carriage 20, which can then transport the said silo to the corridor D of the full silos.

Figure 12:
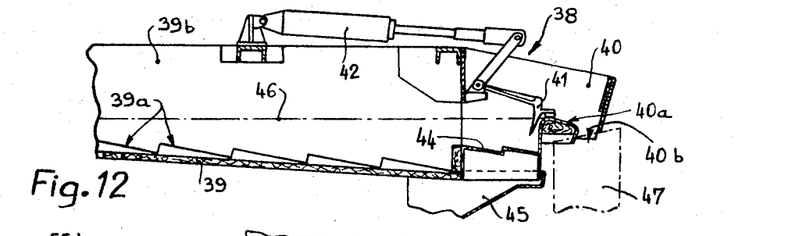
FIGURE 12 is a partial longitudinal section of the filling mechanism of the loading station.

Above the push mechanism 37 described above, the loading station B comprises a filling mechanism which is schematically represented at 38 on FIG. 4. As shown in detail in FIG. 12, this filling mechanism 38 comprises a slanting vibrating table 39 whose upper surface is provided with stair-shaped depressions or teeth 39a and is divided by vertical partitions 39b into a series of longitudinal corridors corresponding to the number of caissons 1 provided in each silo 1–2 (six being shown in the embodiment under consideration). Each corridor is associated with a hopper 40 which can be shut by a suitably-shaped shutter 41. Each of these shutters 41 is controlled by a pneumatic ram 42 (FIG. 12) mounted on a transverse girder 43 which simultaneously insures the fastening of the aforementioned partitions 39b. Within each hopper 40 a threshold 40a is provided in front of which at a height between the said threshold 40a and the lower end of the vibrating table 39 is a sieve or comb 44. The comb 44 is constituted by a series of parallel blades, suitably placed transversally so as to let dry paste debris pass therethrough and then slide onto an inclined plate 45 to be collected into a suitable receptacle (not shown). It is understood that at the beginning of operation of filling mechanism 38 the cut pastes first pile up to a level corresponding to the horizontal line 46 determined by the threshold 40a, then flows through the opening 40b of the hopper 40 by under the effect of vibrations or jolts imparted to the table 39, the said pastes being thus held in transverse aligned position during their movement.

Below the hoppers 40, the filling mechanism 38 has a battery of vertical spouts 47 (FIGS. 13 to 15), six such spouts being shown mounted on the inside of a frame 48 suitably fixed on the fixed support of the system. The width of each spout 47 is equal to that of the compartments 1a and 1b of the silos 1–2, while its length substantially corresponds to that of the caissons 1 of the said silos. The interior wall of ecah of these spouts 47 is provided with superimposed guides 49, identical to the guides 4 of compartments 1a and 1b. The wall turned towards the back of each spout also has an opening 47a in front of which is disposed a shut-off shutter 50, pivotally mounted on a horizontal axle 51.

Figure 14:
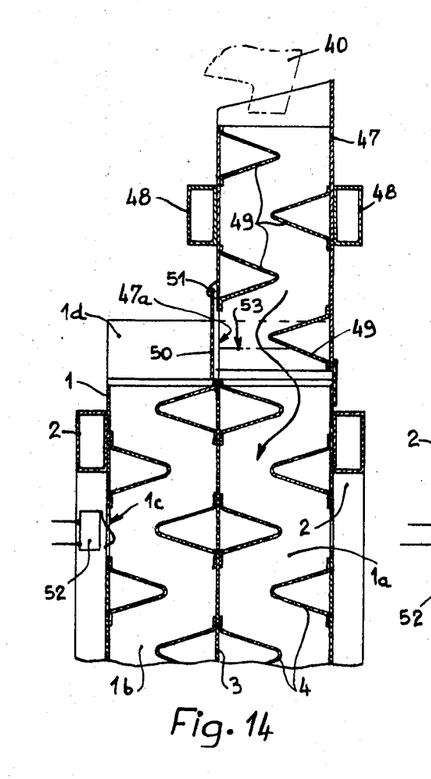
FIGURES 14 and 15 are schematic vertical sections illustrating the filling of the two compartments of a silo.
Figure 15:
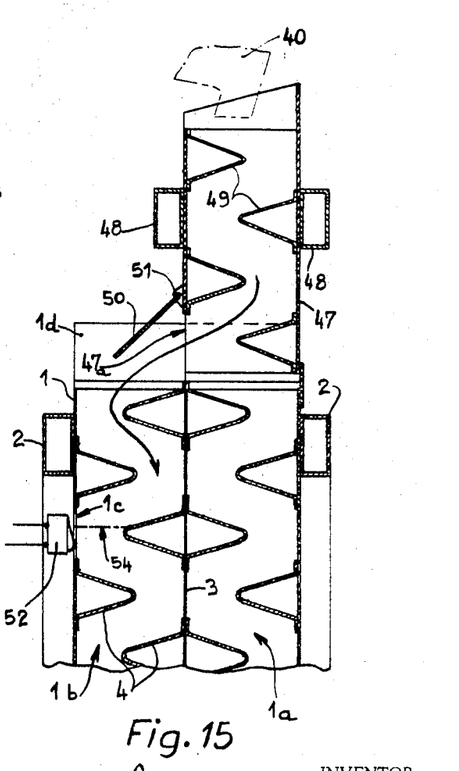

When an empty silo 1–2 is brought to the loading station B, it engages under the spouts 47, the upper ends 1d of the transverse partitions of the caissons 1 engaging between the shutters 51, suitably sized for this purpose. As is shown in FIGS. 14 and 15, the lower end of each spout 47 is then axially placed above compartment 1a of each of the caissons 1 of the silo. The support of the system has six electric switches 52 whose activating or feeling members extend into the upper windows 1c opposite the caissons of the silos when the latter are brought to the loading station B. As will be shown below, each of these switches 52 is inserted in the feed circuit of the corresponding pneumatic ram 42.

The pneumatic rams 42 are automatically activated towards their open positions in such a way that the cut pastes pass through the hoppers 40 and the spouts 47 to fill the compartments 1a of the different silo caissons. When the level reaches line 53 of FIG. 14 the pastes exert a lateral force on the shutter 50 of each spout 47 which causes the related shutter to pivot, as shown in FIG. 15, whereupon the pastes then fill the compartment 1b of each caisson until their level reaches line 54 corresponding to the feelers of the switch 52 under consideration, which switch 52 activates its corresponding pneumatic ram 42 and causes the closing of the shutter 41 which is associated with it. The switches 52 are at such a height that the quantity of pastes which remains in the hopper 40 and in the corresponding spout 47 suffices to correctly fill compartment 1b of each caisson, the shutter 50 returning by gravity to the vertical position shown in FIG. 14. The silo is consequently suitably filled.

The full silos are thus stacked in corridor D until a convenient moment for the weighing and packing operations to begin. The eclipsing mechanism 17 mounted downstream of this corridor D insures the proper feeding of carriage 20 mounted in the transverse bridge E, the silos being thus taken one-by-one so as to be brought to the upper end of corridor A. On the axis of bridge E is a lower trap which constitutes the discharge station F which communicates with the input hopper (not shown) of a weigher-regulator, which is itself associated with an appropriate packing mechanism. Above this trap is the emptying mechanism represented in FIG. 16. The whole of the discharged station F is situated slightly above the corresponding end of corridor A, as will be hereinafter explained.

Figure 16:
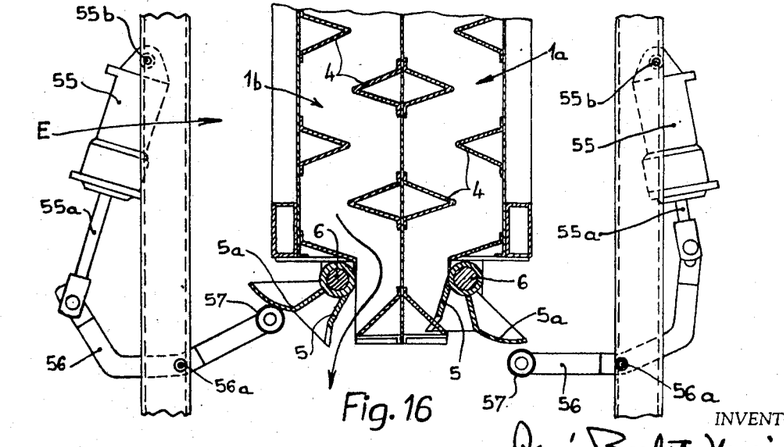
FIGURE 16 is a detailed vertical section illustrating the arrangement and operation of a discharge station.

As shown, this emptying mechanism as shown in FIG. 16 comprises two rams 55, each of whose movable piston 55a is coupled to a bent lever 56, pivoted as at 56a on one of the supports of bridge E. The end of each lever 56 has a loose roller 57 which is intended to cooperate with the handling ears 5a of the shut-off shutters 5 associated with vertical compartments 1a and 1b of silos 1–2. As illustrated for the right hand shutter in FIG. 16, at the normal resting position the roller 57 of each lever 56 is disposed beneath the ear 5a of compartment 1a or 1b of the caisson which is opposite the emptying mechanism. It is understood that when the ram 55–55a is activated, the bottom of the cylinder being itself hinged at 55b to the bridge support, the lever 56 rotates around pivot 56a in such a way that roller 57 is pushed upwardly and raises ear 5a to the position represented for the left jack in FIG. 16. The shutter 5 is consequently opened against the action of the returning spring 7 (FIG. 2) and the pastes can thus fall into the hopper of the weigher-regulator.

Electrical feeling devices are of course provided to successively activate the two rams 55–55a and to cause the jerked advance of the silo the latter moving each time a distance corresponding to the distance between two adjacent caissons 1. The different caissons 1 of the silo are thus successively emptied and, with carriage 20 being again put in motion, the said silo comes in front of the upper end of corridor A. The transfer mechanism 29 supported by this carriage insures its engagement on the rails 10 of this corridor.

As indicated in the preamble, the different mechanisms of the system according to the invention can be controlled in an automatic manner, preferably by means of two programmers, one for the loading of empty silos and their storing while full in corridor D, and the other for the discharge and stocking of empty silos in corridor A.

FIGS. 17 to 20 illustrate an embodiment of the invention in which the rails 10 provided for the support of silos 1–2 within storing corridors A and D are horizontally disposed. It is well understood that in such a case it is necessary to provide means to insure the positive motion of the silos on the aforementioned rails, while leaving them free to remain in the stocking position.

Figure 17:
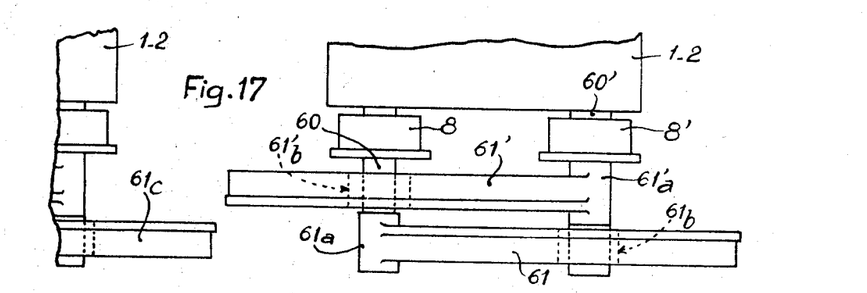
FIGURES 17 to 20 illustrate a different embodiment of the means for driving the silos inside the system.
Figure 18:
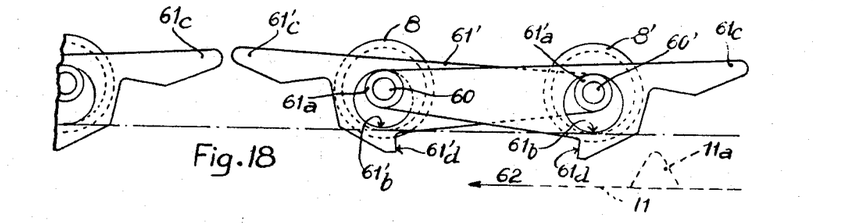

To this end and as shown in FIGS. 17 and 18, a sleeve 61a is pivotally mounted on an axle 60 which supports a roller 8. This sleeve is integral with an overhung arm 61 which has an opening 61b which receives with considerable clearance the free extremity of the axle 60' forming the support for the adjacent roller 8' of the silo. This axle 60' is itself provided with a pivoting arm 61' identical to the arm 60, but transversally offset in relation to the latter, as is clearly shown in FIG. 17. Beyond its opening 61b, 61b', each arm 61, 61' comprises an axial extension 61c, 61c', suitably profiled. Besides the lower edges of these arms 61, 61', are shaped so as to form a driving ramp and comprise lugs or beaks 61d, 61d'. It is understood that extensions 61c, 61c' form counterweights and thus tend to hold the upper edge of the openings 61b, 61b' in contact with the axles 60', 60 while leaving the arms 61, 61' free to angularly pivot around their axles.

The chains 11 (FIG. 4) are horizontally disposed and comprise a series of lugs schematized as 11a (FIG. 18) which project towards the top on the upper side of the said chains. The axial position of the cog wheels 12 which support these chains is different in corridors A and D, so that the lugs 11a selectively cooperate with the arms 61 or 61' of the silos.

Figure 19:
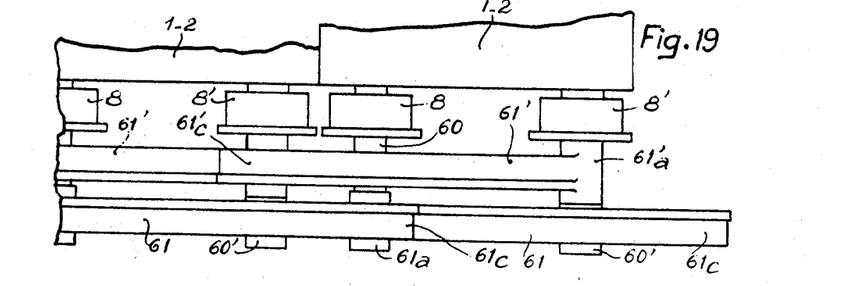
Figure 20:
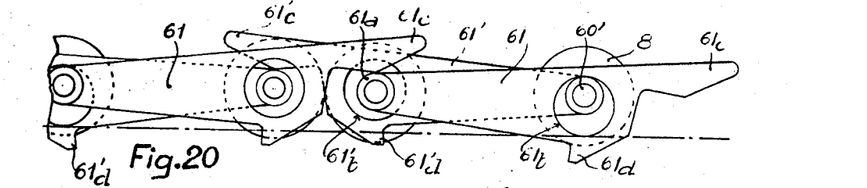

In FIG. 18 it is supposed that the lateral chains 11 moved in the direction of the arrow 62 by being placed on the axis determined by the arms 61'. Under these conditions, one of the lugs 11a will apply itself against the beak 61d' to operate the intended movement of the silo 1–2 along the horizontal rails 10. When the silo arrives at the end of its path, for example, when it pushes against pivoting mechanism 17 (FIG. 6) the arm 61' pivots around the axle 60' (FIGS. 19 and 20), which causes the beak 61d' to eclipse towards the top which also frees the chain lug 11a. Note that when the silos touch one another in the stocking position, the extensions 61c or 61c' are held in a raised position by pressure against the axles 60 or 60' of the preceding silo and insure the holding of the arms 61 and 61' in the upper position, as shown in FIGS. 19 and 20, with the obvious exception of the arms of the last silo. The chains 11 can thus move without supporting abnormally large forces.

It is well understood that the rails 22 provided for displacement of the carriages 20 in a like case are also horizontally disposed, with no slope.

Trials have shown that in all cases the system according to the invention produces better efficiency in the machines and personnel associated with packing operations, because the latter are not connected to the rhythm of the drier.

It is also understood that the system can be used for the stocking of products other than paste products.

I claim:
1. A system for the stocking of paste products prior to packing, particularly long pastes cut to the desired length for packing, comprising in combination, a filling mechanism, a series of silos adapted to receive the paste products from the lower end of the filling mechanism; two parallel corridors each having an outlet end and an inlet end for the storing of empty silos and filled silos respectively; means in each of said corridors to urge said silos toward the outlet end of each of said corridors; two carriages transversely reciprocable in relation to the said corridors; means on the carriage to take the silos one by one from the end of one of the said corridors and to move same to the end adjacent to the opposite corridor; two handling stations one disposed above and the other below the path of movement of the abovementioned carriages so as to enable loading of the empty silos and discharging of the filled silos respectively; each silo comprising a frame, a series of vertical caissons secured to the inside of said frame, and rollers on said frame adapted to roll on rails provided in each of the corridors, and each of the said caissons having an upper loading opening therein and lower shut-off valve means therein; each caisson being divided into at least two vertical compartments whose walls are integral with superimposed guides which determine a baffled path for the pastes to slow their fall and to maintain them in horizontal position all along said path; each carriage being laterally provided with two transfer mechanisms arranged to take a silo at the outlet end of one of the corridors to bring it into the longitudinal axis of the carriage under consideration, and after the movement of the latter to push it to the inlet ends of the rails of the opposite corridor; the filling mechanism comprising a wall whose surface is longitudinally divided according to the number of vertical caissons provided in each silo into a battery of discharge spouts, each of the spouts having its own closing means to automatically insure the correct filling of the two compartments of each silo.

2. A system according to claim 1, in which the movement of the silos inside each corridor is effected by gravity, the rails associated with the rollers being fixed in the corridors in an inclined position.

3. A system according to claim 1, in which each corridor is provided with a mechanism to brake the motion of the silos; said mechanism comprising at least one longitudinal chain driven at slow speed and engaging a ratchet wheel mounted on a lateral wall of each silo in such manner as to prevent the silo from moving at a greater speed than the linear speed of the chain.

4. A system according to claim 1, in which each carriage is provided with rollers cooperating with rails transversely oriented in relation to the two corridors, the reciprocable motion of each carriage being effected by means of a driven endless chain.

5. A system according to claim 1, in which each of the transfer mechanisms comprises an endless chain suitably driven and carrying a series of fingers adapted to cooperate with depressions and projections provided on the lateral walls of the silos.

6. A system according to claim 1, in which there is mounted on the outlet end of each corridor an eliptical lug adapted to assure the blocking of the silos and which is associated with a ram arranged in such a manner as to displace the said lug to free the first silo and to positively push the said silo in the direction of the corresponding carriage, and to simultaneously block the second silo of the corridor under consideration.

7. A system according to claim 1, in which the loading station is provided opposite the storing corridor for the empty silos, in such manner that the empty silos must cross the corresponding carriage to be brought to the said station.

8. A system according to claim 1, in which the loading station comprises a push mechanism arranged so as to move the filled silo in order to bring it to a position where the transfer mechanisms on the corresponding carriage can enter into action.

9. A system according to claim 1, in which the discharge station comprises pneumatic ram mechanisms to control the opening of the shut-off valve means mounted on the lower portion of the silos.

10. A system according to claim 1, in which the movement of the silos inside the storing corridors is insured by lateral driving chains which cooperate with arms pivotally mounted on the sides of the said silos so as to be able to eclipse when the latter become immobilized at the end of the path.

References Cited

UNITED STATES PATENTS

| | | |
|---|---|---|
| 354,199 | 12/1886 | Lorimer. |
| 691,723 | 1/1902 | Martin. |
| 1,738,039 | 12/1929 | Cope et al. |
| 2,327,438 | 8/1943 | Kuhn. |

GERALD M. FORLENZA, Primary Examiner

RAYMOND B. JOHNSON, Assistant Examiner